United States Patent
Woo et al.

(10) Patent No.: US 11,299,066 B2
(45) Date of Patent: Apr. 12, 2022

(54) SYSTEM OF INCREASING TEMPERATURE OF BATTERY FOR VEHICLE

(71) Applicants: HYUNDAI MOTOR COMPANY, Seoul (KR); KIA MOTORS CORPORATION, Seoul (KR)

(72) Inventors: Dong Gyun Woo, Hwaseong-si (KR); Hyun Wook Seong, Hwaseong-si (KR); Jee Heon Kim, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 152 days.

(21) Appl. No.: 16/746,206

(22) Filed: Jan. 17, 2020

(65) Prior Publication Data

US 2021/0053463 A1    Feb. 25, 2021

(30) Foreign Application Priority Data

Aug. 21, 2019  (KR) .......................... 10-2019-0102638

(51) Int. Cl.
*H01M 10/625* (2014.01)
*H01M 10/42* (2006.01)
(Continued)

(52) U.S. Cl.
CPC .......... *B60L 58/27* (2019.02); *H01M 10/425* (2013.01); *H01M 10/625* (2015.04); *H01M 10/637* (2015.04); *H01M 2200/10* (2013.01)

(58) Field of Classification Search
CPC ... B60L 58/27; H01M 10/625; H01M 10/637; H01M 10/425; H01M 2200/10
See application file for complete search history.

(56) References Cited

U.S. PATENT DOCUMENTS 6,078,163 A  *  6/2000  Horie .................. H01M 10/637
                                                                    320/104
9,914,368 B1 *  3/2018  Marcicki ................. B60L 50/40
(Continued)

FOREIGN PATENT DOCUMENTS

JP              4081855 B2    4/2008
KR    10-2014-0010664 A    1/2014
(Continued)

OTHER PUBLICATIONS

KR 20180004675 MT (Year: 2018).*
(Continued)

*Primary Examiner* — Alexander Usyatinsky
(74) *Attorney, Agent, or Firm* — Lempia Summerfield Katz LLC (57) ABSTRACT

A system of increasing a temperature of a battery for a vehicle includes: an on-board charger having a capacitor and a bidirectional direct current (DC) converter having first input/output terminals connected to the capacitor and second input/output terminals connected to a battery and configured to perform a bidirectional power transfer between the first input/output terminals and the second input/output terminals; and a controller to drive, when temperature rising of the battery is required, the bidirectional DC converter such that a direction of a power transfer alternates and supply an alternating current (AC) current having a predetermined frequency to the battery.

8 Claims, 5 Drawing Sheets

(51) Int. Cl.
*B60L 58/27* (2019.01)
*H01M 10/637* (2014.01)

(56) References Cited

U.S. PATENT DOCUMENTS

2017/0320396 A1* 11/2017 Kim .................... H02M 1/4208
2018/0345798 A1* 12/2018 Sakakibara ............... B60L 1/02

FOREIGN PATENT DOCUMENTS

| | | |
|---|---|---|
| KR | 10-1358367 B1 | 1/2014 |
| KR | 10-2015-0059246 A | 6/2015 |
| KR | 10-2018-0004675 A | 1/2018 |
| KR | 20180004675 * | 1/2018 |
| WO | 2011/004464 A1 | 1/2011 |
| WO | WO 2011/004464 * | 1/2011 |

OTHER PUBLICATIONS

2017138942,Decision_to_Grant_ a_Patent_(TRANSLATED),Aug. 4, 2020 (Year: 2020).*
European Search Report dated Aug. 4, 2020 from the corresponding European Application No. 20 151 382.7, 7 pp.

* cited by examiner

SYSTEM OF INCREASING TEMPERATURE OF BATTERY FOR VEHICLE

CROSS REFERENCE TO RELATED APPLICATION

This application claims priority to and the benefit of Korean Patent Application No. 10-2019-0102638, filed on Aug. 21, 2019, the entire contents of which is incorporated herein by reference.

FIELD

The present disclosure relates to a system of increasing a temperature of a battery, and more particularly, to a system of increasing a temperature of a battery for a vehicle.

BACKGROUND

The statements in this section merely provide background information related to the present disclosure and may not constitute prior art.

As the problems of global warming and environmental pollution become serious, research and development on eco-friendly vehicles, which are capable of reducing environmental pollution as much as possible, are being actively carried out in the automotive industry, and the market relating to the eco-friendly vehicles is gradually expanding.

As eco-friendly vehicles, electric vehicles, hybrid vehicles, and plug-in hybrid vehicles, which employ electric motors generating driving forces using electric energy instead of engines which combust existing fossil fuel to generate driving forces are being released worldwide. Among the eco-friendly vehicles using electric energy, the electric vehicles and the plug-in hybrid vehicles receive electric power from external charging equipment, which is connected to a grid, to charge batteries provided in the vehicles and generate kinetic energy required to drive the vehicles using the electric power charged in the batteries.

Meanwhile, impedance of a battery of a vehicle increases at a low temperature rather than a room temperature such that charging efficiency is degraded such that a charging speed is slowed down and a charging amount decreases. In order to improve charging performance of the battery at a low temperature, a temperature rising device has been applied so as to increase a temperature of the battery by generating heat using a portion of a current supplied from a charger to the battery. However, we have discovered that since the temperature rising device generates heat using the electric power charged in the battery, the temperature rising device reduces the charged energy and should be separately added to the vehicle, resulting in a complicated system of the vehicle and increasing a unit cost of the vehicle.

The foregoing is intended merely to aid in the understanding of the background of the present disclosure, and is not intended to mean that the present disclosure falls within the purview of the related art that is already known to those skilled in the art.

SUMMARY

The present disclosure proposes a system of increasing a temperature of a battery for a vehicle, which is capable of inducing heat generation by supplying an alternating current to a battery using a bidirectional converter of an on-board charger (OBC) provided in a vehicle for charging the battery without a separate temperature rising device so as to increase the temperature of the battery at a low temperature.

According to one aspect, a system of increasing a temperature of a battery for a vehicle includes: an on-board charger having a capacitor and a bidirectional direct current (DC) converter having first input/output terminals connected to the capacitor and second input/output terminals connected to a battery and configured to perform a bidirectional power transfer between the first input/output terminals and the second input/output terminals; and a controller configured to drive, when temperature rising of the battery is required, the bidirectional DC converter such that a direction of a power transfer is alternated and supply an alternating current (AC) current having a predetermined frequency to the battery.

In one form of the present disclosure, the on-board charger may further include: a power factor compensation circuit configured to convert external AC power into a direct current (DC) power and apply the DC power to the capacitor in a charging mode in which the external AC power is converted into the DC power, and the DC power is supplied to the battery, and, when the temperature rising of the battery is required, the controller may not operate the power factor compensation circuit.

In one form of the present disclosure, the predetermined frequency may be determined on the basis of a current frequency in an area in which impedance exhibits a relatively low level compared to a current frequency-impedance characteristic of the battery.

In one form of the present disclosure, the bidirectional DC converter may include a transformer, a first switching circuit connected between the first input/output terminals and a primary winding of the transformer and including a plurality of switching elements, and a second switching circuit connected between the second input/output terminals and a secondary winding of the transformer and including a plurality of switching elements.

In one form of the present disclosure, when the temperature rising of the battery is required, the controller may control the plurality of switching elements of the first switching circuit and the plurality of switching elements of the second switching circuit to be alternately switched.

In one form of the present disclosure, the controller may alternately perform a forward direction operation in which the switching elements of the first switching circuit are switched on or off so that power is supplied from the capacitor to the battery and a reverse direction operation in which the switching elements of the second switching circuit are switched on or off so that power is supplied from the battery to the capacitor on the basis of the predetermined frequency.

In another form of the present disclosure, the first switching circuit may be a bridge circuit which includes a first switching element and a second switching element which are connected in series between a positive terminal and a negative terminal of the first input/output terminals, and a third switching element and a fourth switching element which are connected in series between the positive terminal and the negative terminal of the first input/output terminals. In particular, in the bridge circuit, a first connection node between the first switching element and the second switching element is connected to one end of the primary winding of the transformer, and a second connection node between the third switching element and the fourth switching element is connected to the other end of the primary winding of the transformer.

In other form of the present disclosure, the second switching circuit may be a bridge circuit which includes a fifth switching element and a sixth switching element which are connected in series between a positive terminal and a negative terminal of the second input/output terminals, and a seventh switching element and an eighth switching element which are connected in series between the positive terminal and the negative terminal of the second input/output terminals, and in the bridge circuit, a connection node between the fifth switching element and the sixth switching element is connected to one end of the secondary winding of the transformer, and a connection node between the seventh switching element and the eighth switching element is connected to the other end of the secondary winding of the transformer.

In one form of the present disclosure, the predetermined frequency may be smaller than a switching frequency of the switching elements of the first switching circuit or a switching frequency of the switching elements of the second switching circuit.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, a system of increasing a temperature of a battery for a vehicle according to various forms of the present disclosure will be described in more detail with reference to the accompanying drawings.

Figure 1:
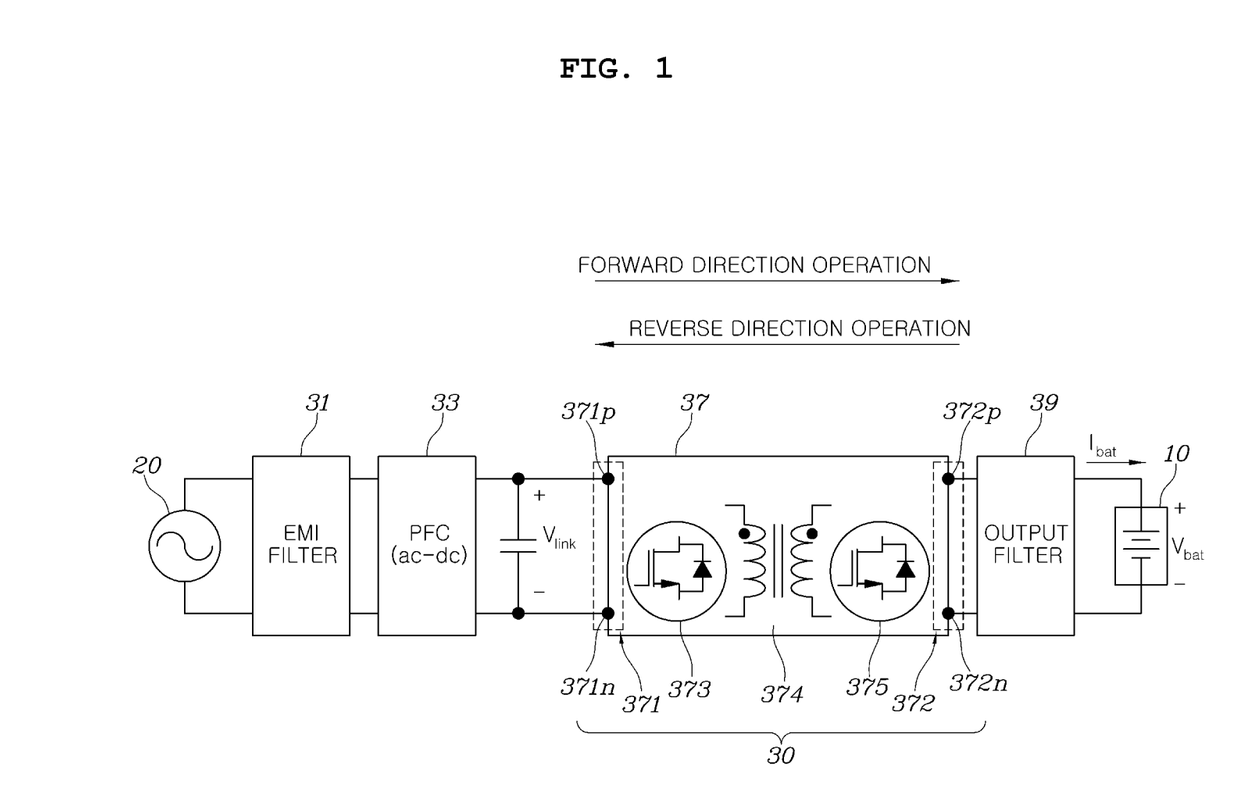
FIG. 1 is a block diagram illustrating a system of increasing a temperature of a battery for a vehicle.
Figure 2:
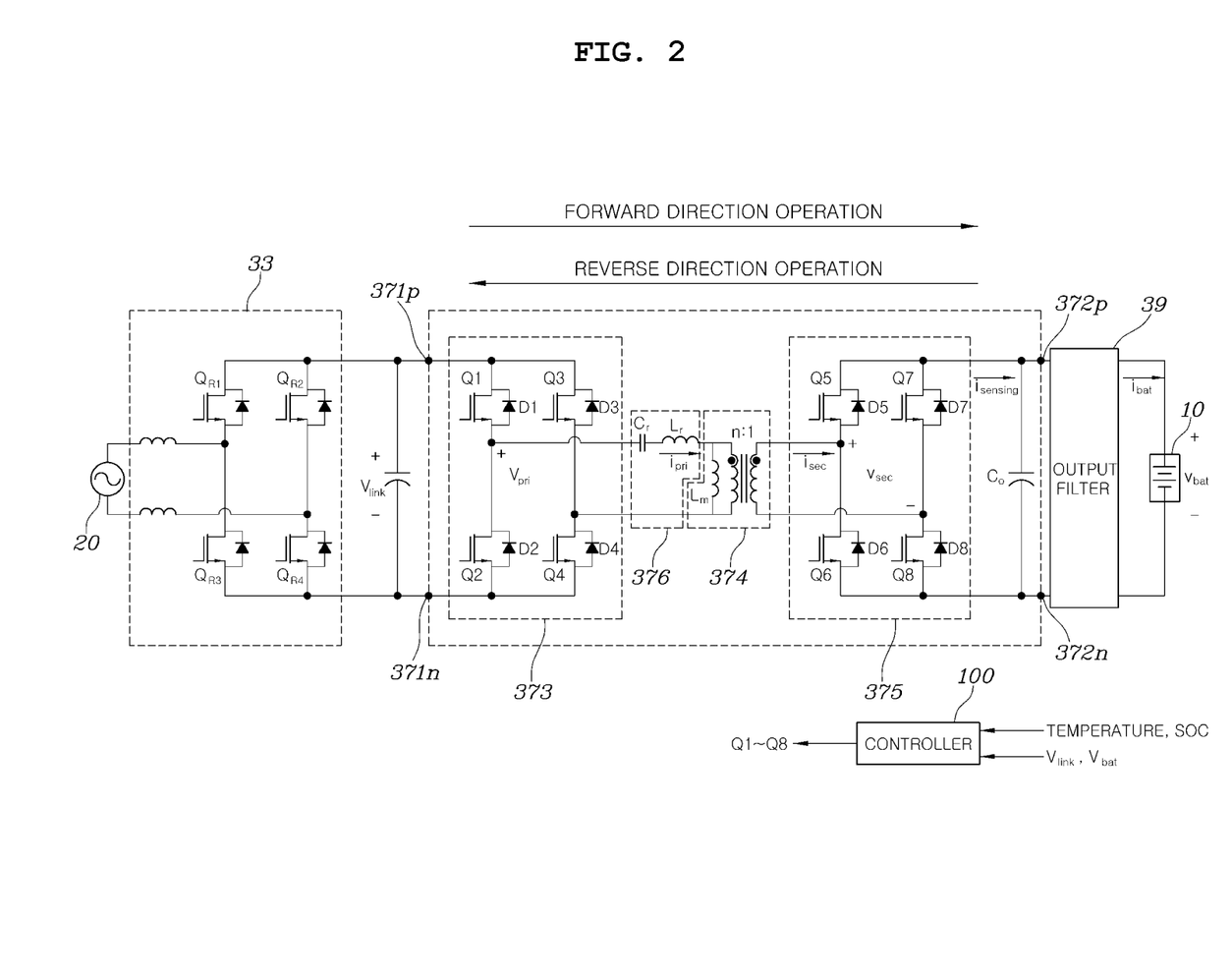
FIG. 2 is a circuit diagram illustrating the system of increasing a temperature of a battery for a vehicle.

FIG. 1 is a block diagram illustrating a system of increasing a temperature of a battery for a vehicle according to one form of the present disclosure, and FIG. 2 is a circuit diagram illustrating the system of increasing a temperature of a battery for a vehicle according to one form of the present disclosure in more detail.

Referring to FIGS. 1 and 2, the system of increasing a temperature of a battery for a vehicle may include: a battery 10 provided in a vehicle, an on-board charger (OBC) 30 for converting external alternating current (AC) power to generate direct current (DC) charging power for charging the battery 10, and a controller 100 for determining whether to control temperature rising of the battery 10 according to a state of the battery 10 and, when the temperature rising of the battery 10 is required, controlling the OBC 30 to provide an AC current having a predetermined frequency to the battery 10. In particular, the OBC 30 may include a bidirectional DC converter 37 which is capable of bidirectionally transferring power.

The battery 10 is a component for storing electric energy which is provided to a motor that is a driving source of the vehicle. Although not shown in the drawings, a terminal of the battery 10 may be connected to an inverter for converting DC power provided from the battery 10 into AC power having a plurality of phases for driving a motor, and the converted electric power under the control of the inverter is provided to the motor so that the motor may be driven. The battery 10 provided in an eco-friendly vehicle may be charged by receiving regenerative energy when the eco-friendly vehicle is driving and, after the driving of the eco-friendly vehicle is terminated, the battery 10 may be charged by receiving electric power provided from external charging equipment.

The OBC 30 may convert AC power of external charging equipment 20, which is provided through a charging cable after the driving of the vehicle is completed, into DC power having a voltage, which is capable of charging the battery 10, and provide the converted DC power to the battery 10, thereby charging the battery 10.

The OBC 30 may include an electromagnetic interference (EMI) filter 31 for removing a high frequency noise component included in the AC power provided from the external charging equipment 20, a power factor compensation circuit 33 for converting AC power into DC power and employing topology of a boost converter circuit so as to compensate for a power factor of the input AC power, a capacitor 35 connected to an output terminal of the power factor compensation circuit 33 and configured to form a DC voltage $v_{link}$, and the bidirectional DC converter 37 for converting the DC voltage $v_{link}$ formed across both ends of the capacitor 35 into a DC voltage having a magnitude required to charge the battery 10.

In one form of the present disclosure, the bidirectional DC converter 37 included in the OBC 30 may include a first switching circuit 373 having first input/output terminals 371p and 371n connected to an AC power side, i.e., the output terminal of the power factor compensation circuit 33, second input/output terminals 372p and 372n connected to the battery 10, and a plurality of switching elements Q1 to Q4 connected to the first input/output terminals 371p and 371n and a second switching circuit 375 having a transformer 374 with a primary winding connected to the first switching circuit 373 and a plurality of switching elements Q5 to Q8 connected between a secondary winding of the transformer 374 and the second input/output terminals 372p and 372n.

In particular, as shown in FIG. 2, the bidirectional DC converter 37 is implemented as an inductor-inductor-capacitor (LLC) resonant converter. When the bidirectional DC converter 37 is implemented as an LLC resonant converter, the bidirectional DC converter 37 may further include a resonant tank 376 having a resonant capacitor Cr and a resonant inductor Lr between the first switching circuit 373 and the primary winding of the transformer 374 so as to generate a resonant current due to switching of the plurality of switching elements Q1 to Q4.

In one form, the bidirectional DC converter 37 is implemented as the LLC resonant converter. Alternatively, a DC converter having a structure, which includes a transformer for insulating, such as series resonant converter (SRC) topology or phase shift full bridge topology, and switching circuits provided at two windings of the transformer, may be employed as the bidirectional DC converter 37.

The first switching circuit 373 may be implemented as a bridge circuit which includes a first switching element Q1 and a second switching element Q2 connected in series between a positive terminal 371p and a negative terminal 371n of the first input/output terminals 371p and 371n, and a third switching element Q3 and a fourth switching element Q4 connected in series between the positive terminal 371p and the negative terminal 371n of the first input/output terminals 371p and 371n. Here, a connection node between the first switching element Q1 and the second switching element Q2 may be connected to one end of the primary winding of the transformer 374, and a connection node between the third switching element Q3 and the fourth switching element Q4 may be connected to the other end of the primary winding of the transformer 374. As shown in FIG. 2, in the case of a resonant LLC converter, the connection node between the first switching element Q1 and the second switching element Q2 may be connected to a serial connection structure of the resonant inductor Lr and the resonant capacitor Cr constituting the resonant tank 376.

Further, the first to fourth switching elements Q1 to Q4 may include backward diodes D1 to D4, respectively. An anode of a backward diode D1 of the first switching element Q1 may be connected to the connection node between the first switching element Q1 and the second switching element Q2 and a cathode of the backward diode D1 thereof may be connected to the positive terminal 371p of the first input/output terminals. A cathode of a backward diode D2 of the second switching element Q2 may be connected to the connection node between the first switching element Q1 and the second switching element Q2 and an anode of the backward diode D2 thereof may be connected to the negative terminal 371n of the first input/output terminals. Similarly, an anode of a backward diode D3 of the third switching element Q3 may be connected to the connection node between the third switching element Q3 and the fourth switching element Q4 and a cathode of the backward diode D3 thereof may be connected to the positive terminal 371p of the first input/output terminals. A cathode of a backward diode D4 of the fourth switching element Q4 may be connected to the connection node between the third switching element Q3 and the fourth switching element Q4 and an anode of the backward diode D4 thereof may be connected to the negative terminal 371n of the first input/output terminals.

The second switching circuit 375 may be implemented as a bridge circuit which includes a fifth switching element Q5 and a sixth switching element Q6 connected in series between a positive terminal 372p and a negative terminal 372n of the second input/output terminals 372p and 372n, and a seventh switching element Q7 and an eighth switching element Q8 connected in series between the positive terminal 372p and the negative terminal 372n of the second input/output terminals 372p and 372n. Here, a connection node between the fifth switching element Q5 and the sixth switching element Q6 may be connected to one end of the secondary winding of the transformer 374, and a connection node between the seventh switching element Q7 and the eighth switching element Q8 may be connected to the other end of the secondary winding of the transformer 374.

Similar to the first switching circuit 373, the fifth to eighth switching elements Q5 to Q8 in the second switching circuit 375 may include backward diodes D5 to D8, respectively. An anode of a backward diode D5 of the fifth switching element Q5 may be connected to the connection node between the fifth switching element Q5 and the sixth switching element Q6 and a cathode of the backward diode D5 thereof may be connected to the positive terminal 372p of the second input/output terminals. A cathode of a backward diode D6 of the sixth switching element Q6 may be connected to the connection node between the fifth switching element Q5 and the sixth switching element Q6 and an anode of the backward diode D6 thereof may be connected to the negative terminal 372n of the second input/output terminals. Similarly, an anode of a backward diode D7 of the seventh switching element Q7 may be connected to the connection node between the seventh switching element Q7 and the eighth switching element Q8 and a cathode of the backward diode D7 thereof may be connected to the positive terminal 372p of the second input/output terminals. A cathode of a backward diode D8 of the eighth switching element Q8 may be connected to the connection node between the seventh switching element Q7 and the eighth switching element Q8 and an anode of the backward diode D8 thereof may be connected to the negative terminal 372n of the second input/output terminals.

When the battery 10 is charged, the controller 100 may control the switching elements Q1 to Q8 provided in the OBC 30 to apply a DC voltage having an appropriate magnitude which is capable of charging the battery 10. In particular, when a temperature of the battery 10 is less than a predetermined reference temperature so that the battery 10 is in a low temperature state, in order to increase the temperature of the battery 10, the controller 100 may control the switching elements Q1 to Q8 provided in the OBC 30 and apply an AC current having a predetermined reference frequency to the battery 10, thereby rapidly increasing the temperature of the battery 10. To this end, the controller 100 may receive information on the temperature of the battery 10 from a temperature sensor (not shown) of the battery 10 and detect a state of charge (SOC) of the battery 10 so as to determine whether temperature rising control for the battery 10 is possible.

In various exemplary forms of the present disclosure, the controller 100 may be implemented in the form of including a nonvolatile memory (not shown) configured to store data relating to an algorithm for controlling operations of various components of the vehicle or data relating to software commands for reproducing the algorithm, and a processor (not shown) configured to perform operations using the data stored in the nonvolatile memory. Here, the nonvolatile memory and the processor may be implemented as separate chips. Alternatively, the nonvolatile memory and the processor may be implemented as a single integrated chip, and the processor may implemented in the form of one or more processors.

In FIGS. 1 and 2, a reference numeral "39" indicates an output filter for removing noise and the like which are included in power provided to the battery 10.

A more detailed control operation of the controller 100 and an effect resulting from the control operation will be more clearly understood through the following description of a method of controlling a power system for a vehicle.

Figure 3:
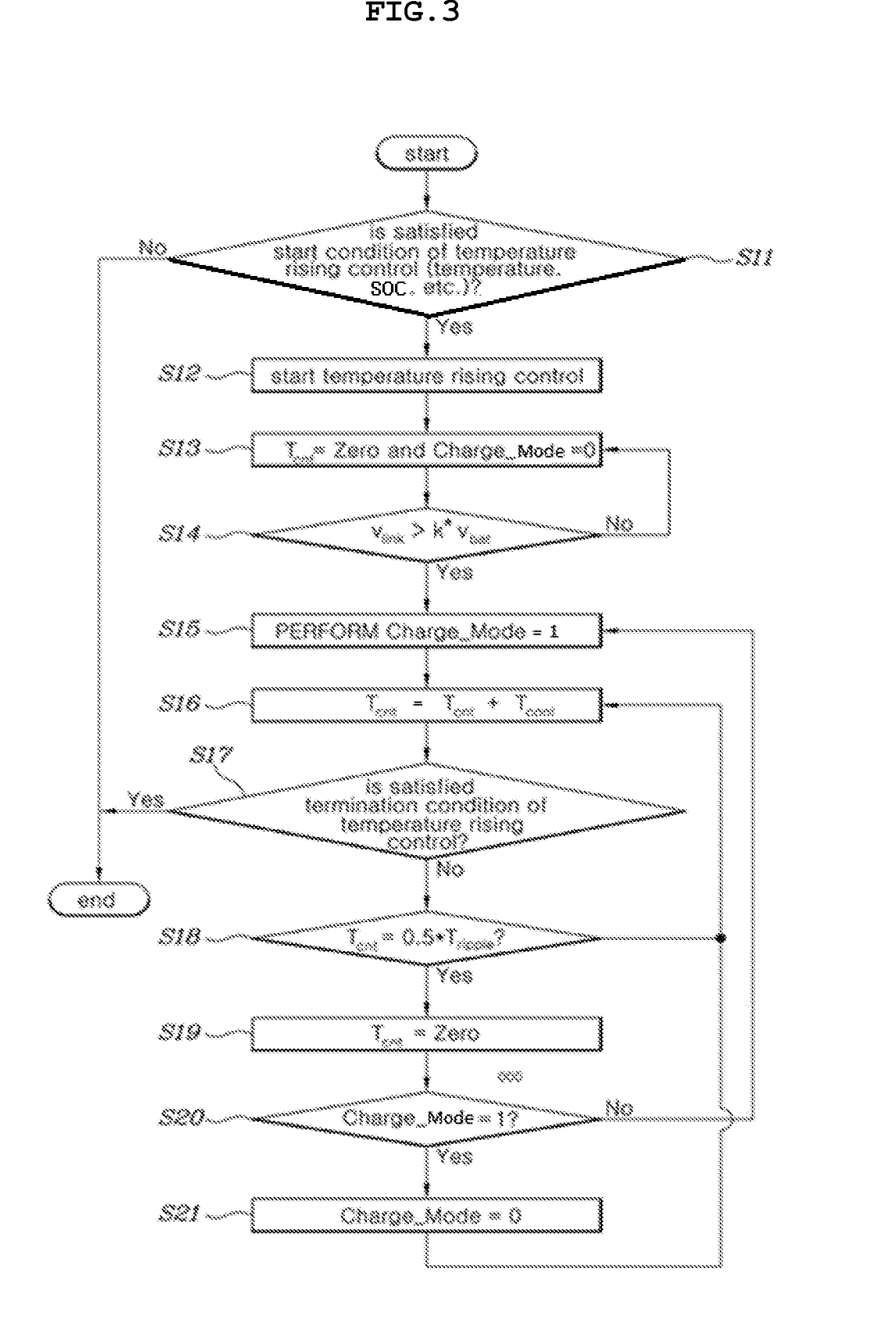
FIG. 3 is a flowchart illustrating an operation of a system of increasing a temperature of a battery for a vehicle.

FIG. 3 is a flowchart illustrating an operation of a system of increasing a temperature of a battery for a vehicle according to one form of the present disclosure.

Referring to FIG. 3, in the system of increasing a temperature of a battery for a vehicle, after starting of the vehicle is turned on, the controller 100 may execute operation S11 of receiving state information of a main battery 10 and determining whether temperature rising control is desired. In operation S11, when the controller 100 determines that a state is sufficient to perform the temperature rising control because the temperature of the battery 10 is less than the predetermined reference temperature and an SOC of the battery 10 is greater than or equal to a predetermined reference value, the controller 100 may begin the temperature rising control for the battery 10 (S12).

When the temperature rising control is started (S12), the controller 100 may set a counter time $T_{cnt}$ to zero and control the bidirectional DC converter 37 to transfer power from the battery 10 to the capacitor 35, i.e., from the second input/output terminals 372p and 372n of the bidirectional DC converter 37 to the first input/output terminals 371p and 371n thereof (S13). In operation S13, the controller 100 may switch the fifth to eighth switching elements Q5 to Q8 of the second switching circuit 375 on or off and convert a DC voltage of the battery 10 into an AC voltage to apply the AC voltage to the secondary winding of the transformer 374. Accordingly, the AC voltage which is converted in magnitude according to a turns ratio of the transformer 374 is induced to the primary winding of the transformer 374. The AC voltage induced to the primary winding is rectified by the backward diodes D1 to D4 of the first switching circuit 373 and applied to the capacitor 35 such that the capacitor 35 is charged.

When the voltage $v_{link}$ of the capacitor 35 becomes greater than a predetermined reference voltage $k*v_{bat}$ (S14), the controller 100 controls the bidirectional DC converter 37 to transfer power from the capacitor 35 to the battery 10, i.e., from the first input/output terminals 371p and 371n the bidirectional DC converter 37 to the second input/output terminals 372p and 372n thereof (S15), and the controller 100 adds a temperature rising control period $T_{cont}$ to the counter time $T_{cnt}$ to record the added result (S16). Here, the temperature rising control period $T_{cont}$ means a period of performing a temperature rising control task. For example, when the temperature rising control task is performed at a frequency of 100 kHz, the temperature rising control period $T_{cont}$ may become 1/100000 seconds.

In order to control the bidirectional DC converter 37 to transfer the power from the first input/output terminals 371p and 371n to the second input/output terminals 372p and 372n, the controller 100 may switch the first to fourth switching elements Q1 to Q4 of the first switching circuit 373 on or off and convert the DC voltage of battery 10 into an AC voltage to apply the AC voltage to the primary winding of transformer 374. Accordingly, the AC voltage which is converted in magnitude according to a turns ratio of the transformer 374 is induced to the second winding of the transformer 374. The AC voltage induced to the second winding is rectified by the backward diodes D5 to D8 of the second switching circuit 375 and applied to the battery 10 such that the battery 10 is charged.

In FIG. 3, "Charge_Mode" means a power transmission direction of the bidirectional DC converter 37. A value of "Charge_Mode" being zero means that the bidirectional DC converter 37 operates to transfer power from the second input/output terminals 372p and 372n to the first input/output terminals 371p and 371n, and the value of "Charge_Mode" being one means that the bidirectional DC converter 37 operates to transfer power from the first input/output terminals 371p and 371n to the second input/output terminals 372p and 372n. The bidirectional DC converter 37 is a device of which main purpose is to convert external power and transfer the converted external power to the battery 10. For convenience of description, when a direction of a power transfer is from the first input/output terminals 371p and 371n of the bidirectional DC converter 37 to the second input/output terminals 372p and 372n thereof, this is called a forward direction, whereas, when the direction of the power transfer is from the second input/output terminals 372p and 372n to the first input/output terminals 371p and 371n, this is called a reverse direction.

Subsequently, the controller 100 may check a temperature and an SOC of the battery 10 to determine whether temperature rising control for the battery 10 is terminatable (S17). When the temperature rising control for the battery 10 is determined as not being terminatable, the controller 100 may compare the counter time $T_{cnt}$ with an alternating period $T_{ripple}$ of a predetermined battery current (S18).

In the determination of whether the temperature rising control for the battery 10 is terminatable (S17), when the controller 100 determines that a state is not sufficient to perform the temperature rising control because the temperature of the battery 10 is greater than or equal to the predetermined reference temperature or the SOC of the battery 10 is equal to or less than the predetermined reference value, the controller 100 may terminate the temperature rising control for the battery 10. When the temperature of the battery 10 is less than the predetermined reference temperature and the SOC thereof is greater than or equal to the predetermined reference value, the controller 100 may determine to continuously perform the temperature rising control.

In the comparing of the counter time $T_{cnt}$ with the alternating period $T_{ripple}$ of the predetermined battery current (S18), the controller 100 may set the counter time $T_{cnt}$ to zero again when the counter time $T_{cnt}$ is ½ of the predetermined alternating period $T_{ripple}$ (S19), and, when the bidirectional DC charger 30 is in a state in which a forward direction operation is being performed (S20), the controller 100 may control the bidirectional DC charger 30 such that the bidirectional DC charger 30 operates in the reverse direction. Further, when the bidirectional DC charger 30 is in a state in which a reverse direction operation is performed instead of the forward direction operation (S20), the controller 100 may control the bidirectional DC charger 30 to perform the forward operation (S15).

Figure 4:
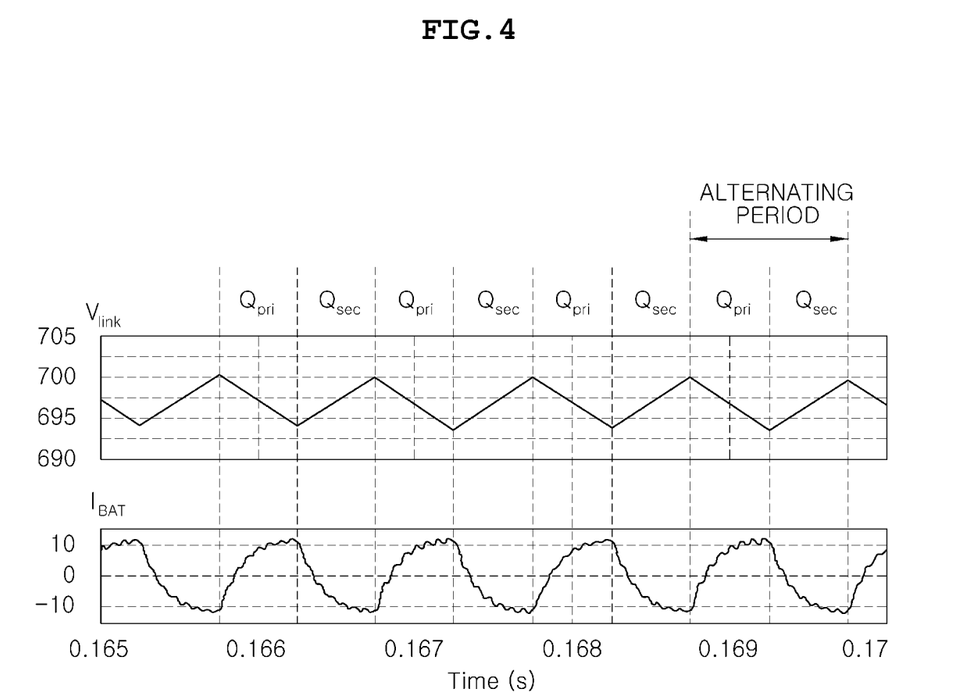
FIG. 4 shows waveform diagrams illustrating an operation of a switching circuit of the system of increasing a temperature of a battery for a vehicle and a flow of an alternating current (AC) according to the operation of the switching circuit thereof.

Through the above-described control of the controller 100, the bidirectional DC charger 30 may repeat the forward direction operation and the reverse direction operation during the alternating period as shown in FIG. 4.

FIG. 4 shows waveform diagrams illustrating an operation of a switching circuit of the system of increasing a temperature of a battery for a vehicle according to one form of the present disclosure and a flow of an alternating current (AC) according to the operation of the switching circuit thereof.

Referring to FIG. 4, owing to the control of the controller 100 as shown in FIG. 3, the bidirectional DC charger 30 of the system of increasing a temperature of a battery for a vehicle may repeat the forward direction operation and the reverse direction operation during one alternating period. In FIG. 4, in a section indicated by "$Q_{pri}$," the controller 100 switches switching elements S1 to S4, which are included in the first switching circuit 373 of the bidirectional DC charger 30, on or off to provide the power charged in the capacitor 35 to the battery 10. In the section $Q_{pri}$, the voltage $v_{link}$ of the capacitor 35 is decreased and a current $i_{bat}$ provided to the battery 10 is increased.

Further, in FIG. 4, in a section indicated by "$Q_{sec}$," the controller 100 switches switching elements S5 to S8, which are included in the second switching circuit 375 of the bidirectional DC charger 30, on or off to provide the power of the battery 10 to the capacitor 35. In the section $Q_{sec}$, the voltage $v_{link}$ of the capacitor 35 is increased and the current $i_{bat}$ provided to the battery 10 is increased such that a state in which a current is output from the battery 10 is achieved.

As described above, according to one form of the present disclosure, temperature rising of the battery 10 may be induced by changing the power transfer direction of the bidirectional DC converter 37 in the OBC 30 with a predetermined period to provide the AC current to the battery 10.

During the above-described temperature rising control for a battery, the power factor compensation circuit 33 in the OBC 30 may not operate.

Figure 5:
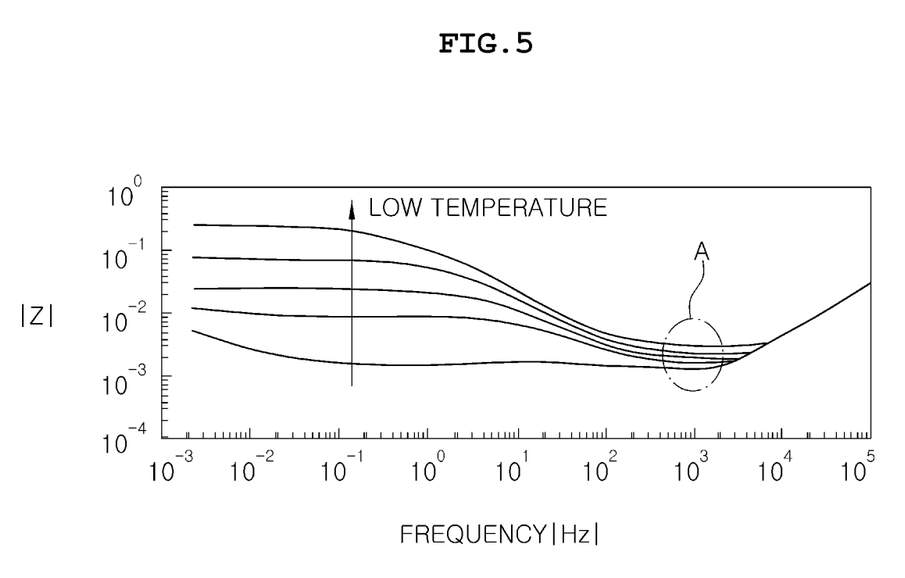
FIG. 5 is a graph illustrating an example of a current frequency-impedance relationship of a battery.

Meanwhile, according to one form of the present disclosure, a frequency of the AC current may be determined by a current frequency-impedance characteristic of the battery 10. Since internal resistance (internal impedance) of the battery 10 is very significantly increased in a low temperature environment, even when the AC current is increased, a situation in which the battery 10 cannot output or receive the AC current may occur. Therefore, according to one form of the present disclosure, in consideration of the frequency-impedance characteristic of the battery 10, even when the temperature of the battery 10 is in a low temperature condition, it is desired to select the frequency of the AC current in a frequency range in which impedance of the battery 10 exhibits a low level. That is, even in a low temperature state in an area indicated by "A" in FIG. 5 illustrating an example of a current frequency-impedance relationship of the battery 10, it is desired to determine the frequency of the AC current in an area in which impedance |Z| of the battery 10 exhibits a relatively low level (a frequency of about 1 kHz in the example of FIG. 5). Here, as shown in FIG. 4, the frequency of the AC current is substantially the same as a change frequency in the power transfer direction of the bidirectional DC converter 30.

Further, according to various forms of the present disclosure, the frequency of the AC current provided to the battery 10 during the temperature rising control has a value that is smaller than that of the switching frequency of the switching elements Q1 to Q8 in the first switching circuit 373 and the second switching circuit 375. The AC current may be formed due to the switching of the switching elements Q1 to Q8 in the first switching circuit 373 and the second switching circuit 375. That is, the AC current having a desired magnitude may be generated by repeatedly switching the switching elements Q1 to Q8. In consideration of the above description, when the frequency of the AC current is greater than the switching frequency of the switching elements Q1 to Q8, since a rate at which the AC current changes is higher than that at which the AC current is formed through the switching of the switching elements Q1 to Q8, it impossible to produce an AC current of a desired magnitude. Therefore, the frequency of the AC current should have a value that is smaller than that of the switching frequency of the switching elements Q1 to Q8 in the first switching circuit 373 and the second switching circuit 375.

As described above, the system of increasing a temperature of a battery for a vehicle can increase the temperature of the battery in a low temperature environment by utilizing a charger mounted in the vehicle without using an additional device for temperature rising such that power consumption can be reduced and the system can be simplified as well as it is possible to suppress an increase in unit cost of the vehicle.

Further, the system of increasing a temperature of a battery for a vehicle selects the frequency of the AC current, which is provided to the battery, from a frequency area having relatively low impedance even at a low temperature in the current frequency-impedance relationship of the battery such that the temperature rising control for the battery is possible even in a situation of an extremely low temperature.

In accordance with a system of increasing a temperature of a battery for a vehicle, a temperature of a battery can be increased in a low temperature environment by utilizing a charger mounted in a vehicle without using an additional device for temperature rising such that power consumption can be reduced and the system can be simplified as well as it is possible to suppress an increase in unit cost of a vehicle.

Further, in accordance with the system of increasing a temperature of a battery for a vehicle, a frequency of an AC current, which is provided to the battery, is selected from a frequency area having relatively low impedance even at a low temperature in a current frequency-impedance relationship of the battery such that temperature rising control for the battery is possible even in a situation of an extremely low temperature.

The effects obtained by the present disclosure is not limited to the above-mentioned effects and other effects which are not mentioned can be clearly understood by those skilled in the art to which the present disclosure pertains from the above description.

Although exemplary forms of the present disclosure have been described for illustrative purposes, those skilled in the art will appreciate that various modifications, additions and substitutions are possible, without departing from the scope and spirit of the present disclosure.

While the specific forms of the present disclosure have been described in detail, it is obvious to those skilled in the art that various modifications and alternations can be made without departing from the technical spirit and scope of the present disclosure and these modifications and alternations fall within the scope of the present disclosure.

What is claimed is:

1. A system of increasing a temperature of a battery for a vehicle, the system comprising:
    an on-board charger including a capacitor and a bidirectional direct current (DC) converter having first input/output terminals connected to the capacitor and second input/output terminals connected to a battery and configured to perform a bidirectional power transfer between the first input/output terminals and the second input/output terminals; and
    a controller configured to:
        drive, when temperature rising of the battery is required, the bidirectional DC converter such that a direction of a power transfer is alternated, and
        supply an alternating current (AC) current having a predetermined frequency to the battery,
    wherein the bidirectional DC converter includes:
        a transformer;
        a first switching circuit connected between the first input/output terminals and a primary winding of the transformer and including a plurality of switching elements; and a second switching circuit connected between the second input/output terminals and a secondary winding of the transformer and including a plurality of switching elements.

2. The system of claim 1, wherein:
the on-board charger further includes a power factor compensation circuit configured to:
convert external AC power into a direct current (DC) power and
apply the DC power to the capacitor in a charging mode in which the external AC power is converted into the DC power and the DC power is supplied to the battery; and
when the temperature rising of the battery is required, the controller does not operate the power factor compensation circuit.

3. The system of claim 1, wherein the predetermined frequency is determined based on a current frequency in which impedance exhibits a lowest level compared to a current frequency-impedance characteristic of the battery in a low temperature condition.

4. The system of claim 1, wherein, when the temperature rising of the battery is required, the controller is configured to control the plurality of switching elements of the first switching circuit and the plurality of switching elements of the second switching circuit to be alternately switched.

5. The system of claim 1, wherein the controller is configured to alternately perform a forward direction operation in which the plurality of switching elements of the first switching circuit are switched on or off so that power is supplied from the capacitor to the battery and a reverse direction operation in which the switching plurality of elements of the second switching circuit are switched on or off so that power is supplied from the battery to the capacitor based on the predetermined frequency.

6. The system of claim 1, wherein the first switching circuit is a bridge circuit which includes a first switching element and a second switching element which are connected in series between a positive terminal and a negative terminal of the first input/output terminals, and a third switching element and a fourth switching element which are connected in series between the positive terminal and the negative terminal of the first input/output terminals, wherein the bridge circuit further includes: a first connection node between the first switching element and the second switching element, and a second connection node between the third switching element and the fourth switching element, and wherein the first connection node is connected to a first end of the primary winding of the transformer, and the second connection node is connected to a second end of the primary winding of the transformer.

7. The system of claim 1, wherein the second switching circuit is a bridge circuit which includes a fifth switching element and a sixth switching element which are connected in series between a positive terminal and a negative terminal of the second input/output terminals, and a seventh switching element and an eighth switching element which are connected in series between the positive terminal and the negative terminal of the second input/output terminals, and wherein in bridge circuit, a connection node between the fifth switching element and the sixth switching element is connected to a first end of the secondary winding of the transformer, and a connection node between the seventh switching element and the eighth switching element is connected to a second end of the secondary winding of the transformer.

8. The system of claim 1, wherein the predetermined frequency is smaller than a switching frequency of the plurality of switching elements of the first switching circuit or a switching frequency of the plurality of switching elements of the second switching circuit.

\* \* \* \* \*